United States Patent [19]

Sterner, Jr.

[11] E Patent Number: Re. 31,721

[45] Reissued Date of Patent: Nov. 6, 1984

[54] INSULATED MULTIPLE COMPONENT SINGLE PLANE BUILDING STRUCTURE PORTAL CLOSURE

[75] Inventor: Maurice E. Sterner, Jr., Spring Grove, Pa.

[73] Assignee: Product Design & Development Inc., York, Pa.

[21] Appl. No.: 498,055

[22] Filed: May 25, 1983

Related U.S. Patent Documents

Reissue of:

[64] Patent No.: 4,324,072
Issued: Apr. 13, 1982
Appl. No.: 136,060
Filed: Mar. 13, 1980

[51] Int. Cl.[3] ..... E05D 15/20

[52] U.S. Cl. ..... 49/129; 49/130; 49/176; 49/181; 49/260; 49/DIG. 1

[58] Field of Search ..... 49/128, 129, 130, 127, 49/176, 181, DIG. 1, 260

[56] References Cited

U.S. PATENT DOCUMENTS

| | | | |
|---|---|---|---|
| 1,002,757 | 9/1911 | Ribau | 49/128 |
| 1,441,673 | 1/1923 | Fiola | 49/128 |
| 1,621,851 | 3/1927 | Minich | 49/129 |
| 1,975,187 | 10/1934 | Aberle et al. | 49/128 |
| 2,026,119 | 12/1935 | Benzenberg | 49/129 |
| 2,144,782 | 1/1939 | Swanson | 49/130 |
| 2,169,343 | 8/1939 | Kaul | 49/127 |
| 2,266,076 | 12/1941 | Reynolds | 49/181 X |
| 2,289,960 | 7/1942 | Grignet | 49/129 |
| 2,317,312 | 4/1943 | Swanson et al. | 49/130 |
| 2,908,052 | 10/1959 | Jakush | 49/129 |
| 3,055,062 | 9/1962 | Peters et al. | 49/181 X |
| 3,055,063 | 9/1962 | Peters et al. | 49/181 X |
| 3,462,884 | 8/1969 | La Bissoniere | 49/404 |
| 3,571,976 | 3/1971 | Schmid | 49/130 |
| 3,694,959 | 10/1972 | Gartner | 49/128 |
| 3,959,926 | 6/1976 | Noecker et al. | 49/181 |
| 4,064,653 | 12/1977 | Randall et al. | 49/DIG. 1 X |
| 4,144,674 | 3/1979 | Dovman | 49/181 X |
| 4,151,682 | 5/1979 | Schmidt | 49/DIG. 1 X |

*Primary Examiner*—Philip C. Kannan
*Attorney, Agent, or Firm*—O'Neil & Bean

[57] ABSTRACT

An insulated multiple component single plane building structure portal closure embodying as components thereof a portal closure frame with glazing frame transversely disposed parallel tracks aligned the opposite sides thereof and adapted through use of glazing frame hardware in combination therewith to slidably receive therein one or more glazing frame sashes or panels in either a vertically or horizontally operable window or door assembly wherein the respective sash or panel members thereof are displaceable from a contiguous abutting single plane configuration within the portal closure frame track structure for parallelly slidable displaced movement for opening structure inward pivotal tilting, and removal therefrom or replacement thereto, wherein the entire portal closure frame and glazing frame structures incorporate complementary to the single plane secured closure configuration thereof transverse thermal barrier connectors intermediate the building structure interior and exterior exposure surfaces thereof to thereby substantially reduce thermal differential building structure interior to exterior conductive, air infiltration, and convective heat losses and also reduce glazing surface moisture vapor condensation problems in addition to providing an improved physical security structure for portal closures.

18 Claims, 16 Drawing Figures

INSULATED MULTIPLE COMPONENT SINGLE PLANE BUILDING STRUCTURE PORTAL CLOSURE

Matter enclosed in heavy brackets [ ] appears in the original patent but forms no part of this reissue specification; matter printed in italics indicates the additions made by reissue.

BACKGROUND OF THE INVENTION

The instant invention relates to an insulated multiple component single plane building structure portal closure teaching in combination structural and mechanical means enabling enhanced thermal differential barrier characteristics and air infiltration reduction as well as facilitated opening, tilting, removal, replacement, closing and securement of one or more of a plurality of either vertically or horizontally disposed slidably movable sashes or panels thereof, wherein it is to be understood that building structure portal closures may be either windows or doors of the sliding type but that for purposes of simplicity and ease of discussion and illustration herein, to be understood as being exemplary only, a vertically disposed double hung sliding window and double panel horizontal sliding door will be covered wherein the application of the teachings herein are not thereby specifically limited to uses respectively therewith only but generally to any framed window or door comprising a building structure portal closure having one or more vertically or horizontally slidably displaceable sash or panel members. More specifically, however, this disclosure relates to a single plane insulated portal closure assembled within a support frame having two or more parallelly disposed slide tracks or ways adapted to receive sliding sash or panel closures which are configured to abut in single plane contiguous communication one with the other in the closed configuration.

Inherent to the single plane portal closure sash or panel structure configuration are certain enhanced thermal barrier advantages not obtainable with a conventional off-set sash or panel structural configuration, among which are the following with respect to poor thermal barrier performance characteristics of the latter. First, as a physical consequence of the off-set sash or panel configuration the lower vertical portions of a portal encasement frame and slide jamb structure therefor are exposed to the building structure exterior atmosphere and the upper vertical portions thereof to the building structure interior atmosphere thereby providing a thermal differential conductive conduit or "short circuit" communicating between the respective atmospheres from building structure exterior to interior, and although an extruded vinyl cover shield may be employed as a thermal barrier means the effectiveness thereof in the foregoing circumstance is at best marginal. Likewise, meeting rails of the conventional off-set sash or panel closure structure provide similar thermal differential conductive conduits or "short circuits". Second, vertical air infiltration is promoted rather than reduced or restricted by the off-set sash or panel structure as a result of upwardly communicating openly exposed jamb channels directing exterior atmosphere air up the stile to cause air infiltration therealong as well as along the top rails thereof. And, third, off-set sash or panel structure configurations permit but a single rather than double sash perimeter of weather stripping capability whereby maximum air infiltration dampening is not realized.

Insulative features of the building structure portal closure herein taught are derived in part from the combination of employing a transversely spaced double pane sash or panel glazing having compound support frames constructed of extruded metal pieces joined together by embodying therebetween an interposed elongated insulative connective channel member to thereby reduce substantially conductive thermal differential heat transfer losses between interior and exterior portal closure insert glazing panes in barrier junction between a building structure external and internal thermal gradient, the insulative features of which structure is further enhanced by a similar such insulative joined complementary construction for the portal encasing extruded metal closure frame, being somewhat similar structurally and functionally to those thermal barrier portal closure means as respectively taught in U.S. Pat. No. 3,462,884 to LaBissoniere dated Aug. 26, 1969, and U.S. Pat. No. 4,151,682 to Schmidt dated May 1, 1979.

Additional insulative, and security, features of the instant invention are further derived from the single plane closed configuration thereof somewhat similar to those disclosures as respectively taught in U.S. Pat. No. 1,002,757 to Ribau dated Sept. 5, 1911, U.S. Pat. No. 1,621,851 to Minich dated Mar. 22, 1927, U.S. Pat. No. 2,169,343 to Kaul dated Aug. 15, 1939, U.S. Pat. No. 2,289,960 to Grignet dated July 14, 1942, and U.S. Pat. No. 3,694,959 to Gartner, dated Oct. 3, 1972, the latter of which, as does the instant invention, having application to employment also with horizontally sliding sashes. Additional single plane horizontal sliding portal closure sash and frame structure combinations are shown by the respective teachings in U.S. Pat. No. 2,144,782 to Swanson dated Jan. 24, 1939, and U.S. Pat. No. 2,317,312 to Swanson et al dated Apr. 20, 1943.

The present invention also embodies in combination a sash or panel mounting and sliding hardware assembly means which additionally enables inward pivotal rotation of either a window sash or door panel member during supportable retention thereof within the portal encasement frame structure, and sash or panel removal therefrom and replacement thereto as desired. Among exemplary prior art hardware teachings enabling similar such portal closure use versatility are those as respectively set forth in U.S. Pat. No. 3,055,062 to Peters et al and U.S. Pat. No. 3,055,063 to Peters, both dated Sept. 25, 1962. Certain structural combination variations of sash hardware also providing generally the foregoing functions are as taught in U.S. Pat. No. 1,441,673 to Fiola dated Jan. 9, 1923, U.S. Pat. No. 1,975,187 to Aberle et al dated Oct. 2, 1934, and U.S. Pat. No. 2,266,076 to Reynolds dated Dec. 16, 1941.

Some of the combination features of the instant invention have, in some respects, both structural and/or functional similarities to various of those teachings separately set forth in certain of the prior art disclosures heretofore cited and briefly discussed. However, as will hereinafter be pointed out, the instant invention is distinguishable from said earlier inventions in one or more ways in that the present invention has utility features and new and useful advantages, applications, and improvements in the art of insulated multiple component single plane building structure closures not heretofore known.

SUMMARY OF THE INVENTION

It is the principal object of the instant invention to provide an insulated multiple component single plane building structure portal closure wherein the frame and respective multiple component glaze supporting movable sash or panel members thereof are in turn respectively constructed so as to interpose a thermally nonconductive construction member intermediate the building structure interior and exterior transverse sides thereof such that respectively the inward and outward facing frame, sash or panel, and glazing closure combinations thereof are exposed only to either the building structure interior or exterior ambient atmospheric temperature and humidity conditions without thermal conductivity communication therebetween, thereby enabling substantially improved temperature differential thermal barrier properties with respect both to blocking heat transfer and reduction of atmospheric vapor condensation on pane or panel glazing between exterior and interior surfaces and the abutting sash or panel members thereof.

It is another object of the instant invention to substantially eliminate conductive, air infiltration, and convective heat losses due both to transverse differential thermal transfer effects per se from interior to exterior closure surfaces and also either vertical or horizontal transfer effects by eliminating from the closure structure combination hereof transversely off-set pane or panel configurations.

It is a further object of the instant invention to provide an insulated multiple component single plane building structure portal closure wherein the frame and respective multiple component glaze supporting movable sash or panel members thereof, upon being closed, assume a longitudinally disposed single plane interlocked abuttable heat-to-foot contiguously aligned communication registration one with the other and with the terminal closure frame ends to thereby provide, among other things, a substantially improved portal closure security structure through elimination of off-set pry surface junctions therein whereby surreptitious forced entry to a building structure may be otherwise facilitated.

Still another object of the instant invention is to provide an insulated multiple component single plane building structure portal closure having in combination therewith sash or panel retaining hardware therefor which enables articulated release and transverse parallel plane displaced movement of the sashes or panels thereof from the closed secured configuration for slidable displacement in opening for regulating circulation of inside and outside air and/or accomplishing egress or ingress, further wherein said retaining hardware additionally enables sash or panel release for rotational tilting thereof inwardly to various of infinately variable angles between the transverse displaced parallel plane movement position and an obtuse angle thereto, and also removal thereof from the closure frame, thereby facilitating access for purposes of closure cleaning, maintenance, and/or repair without requiring a person to be on the outside of the building structure.

It is also another object of the instant invention to provide an insulated multiple component single plane building structure portal closure with sashes or panels thereof having double weather-stripping respectively about the entire perimeter thereof to more effectively reduce conductive, air infiltration, and convective thermal differential building structure interior to exterior heat losses.

It is yet another object of the instant invention to provide an insulated multiple component single plane building structure portal closure adaptable to a wide range of energy conserving and security enhancing use applications, is economically produced in either standardized or customized sizes, which is mechanically simple and highly reliable in operation, safe and easily maintained, and capable of being operated by one not possessed of special skills or training.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a front elevation of en exemplary insulated multiple component single plane building structure portal closure embodying the principles of the instant invention, being shown herein as viewed outward looking from the inside of a building structure and for purposes of initial illustration and description as a vertical double hung slide operable window version thereof, wherein the respective sashes of said window are positioned in the closed single plane closure locking mechanism secured configuration.

FIG. 2 is an end elevation of the instant invention exemplary embodiment thereof as seen along the line 2—2 of FIG. 1.

FIG. 3 is a reduced scale sectional elevation of the instant invention illustrated as a vertical double hung slide operable window version exemplary embodiment thereof with, however, the closure locking mechanism being shown in the released configuration and the lower closure sash thereof operably tilted inward from the single plane disposition prepatory to opening as the same would otherwise appear if viewed in the foregoing operable configuration along the line 3—3 of FIG. 1.

FIG. 4 is a view similar to that as shown in FIG. 3, with, however, the lower sash of said portal closure operably disposed to be slidably displaceable vertically relative to the upper sash thereof.

FIG. 5 is a view similar to that as shown in FIG. 4, with, however, the lower sash of said portal closure being operably tilted inwardly for purposes such as cleaning, maintenance, ventilation or the like.

FIG. 6 is a view similar to that as shown in FIG. 5, with, however, both the lower and upper sashes of said portal closure being vertically displaced one with respect to the other, and also tilted inwardly, with a phantom showing of the lower sash illustrating removal thereof, further for purposes such as cleaning, maintenance, ventilation or the like additionally with a phantom showing of the upper sash illustrating removal thereof also for similar purposes as aforesaid.

DETAILED DESCRIPTION OF THE INVENTION

Figures 1, 2, 3, 4, 5, 6:
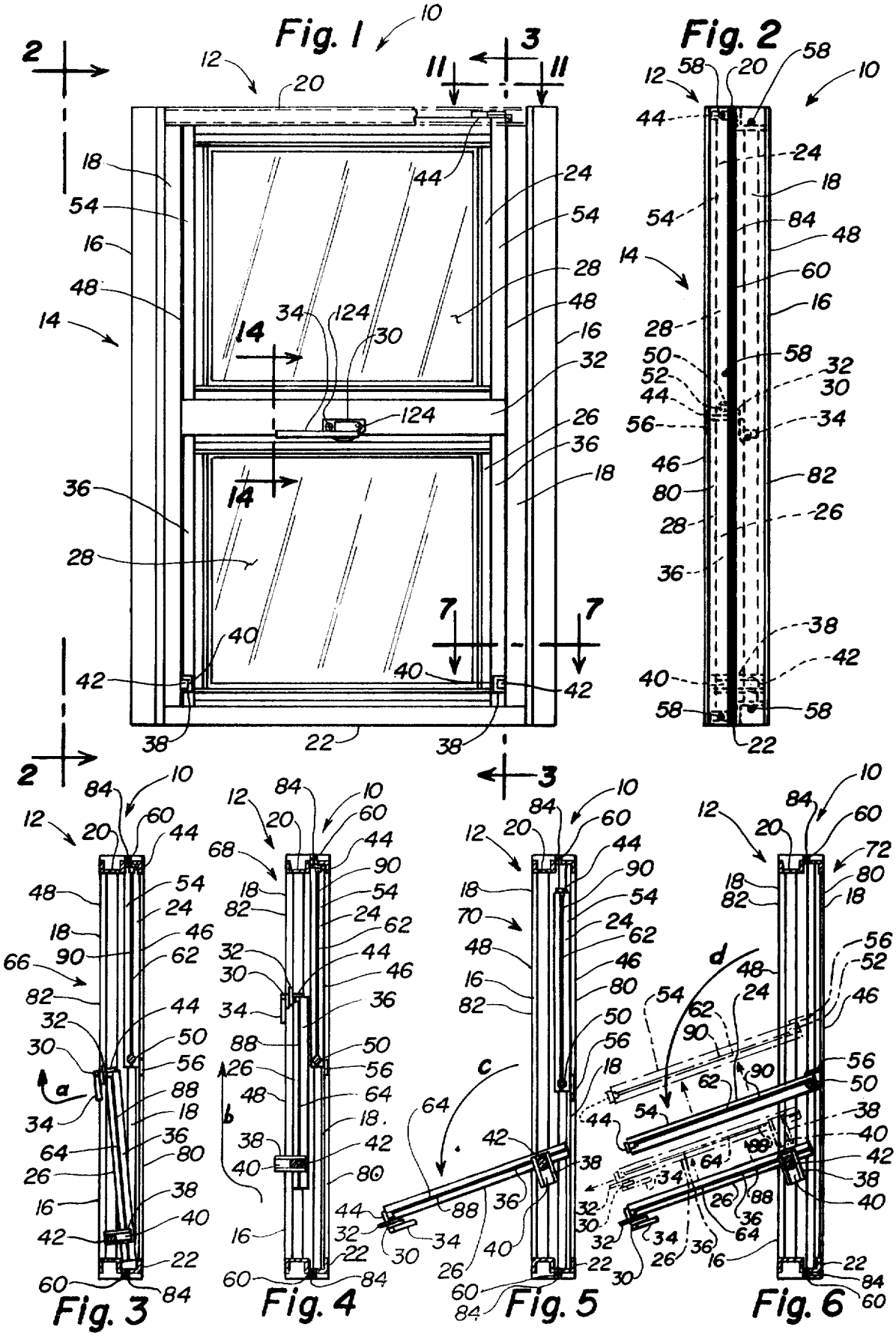

Referring to FIG. 1, the present invention comprising an insulated multiple component single plane building structure portal closure 10 is shown as embodied in an exemplary vertically disposed double hung sliding window version 12 thereof, wherein the same is configured in a closed single plane closure locking mechanism secured configuration 14 as it would appear when viewed outward looking from the inside of a building structure, said portal closure 10 comprising in combination a portal encasement frame structure 16 assembled within a portal opening of a building structure wall (said wall not being herein illustrated) to support and secure therewithin the portal closure slide jambs 18 respectively held in transversely disposed laterally spaced parallel relationship one to the other at the upper ends thereof by a jamb connecting header 20 and at the lower ends thereof by a jamb connecting sill 22, all being mechanically adapted by means of glazing frame hardware components, the structural assemblies and functions of which are to be hereinafter more fully explained, to receive and support in a single plane but transversely displaceable parallel sliding relationship within the slide jamb 18 track structure a vertically slidable and removable upper glazing frame sash 24 and a transversely displaceable vertically slidable and removable lower glazing frame sash 26, each of which sashes 24 and 26 are also pivotally tiltable inward of said building structure, and each of which sashes 24 and 26 respectively encase within the frame structures thereof a set of transversely spaced and sealed transparent thermal barrier glazing panes 28 wherein said sashes 24 and 26 are releasably secured one to the other in a longitudinally disposed single plane vertically interlocked abuttable head-to-foot contiguously aligned communication registration of the closed single plane secured configuration by means of an interiorly disposed pivotal level lock 30 assembled to the lower glazing frame sash abutment closure apron 32 and pivotally operable from the closure secured to release positions by means of the pivotal lever lock handle 34.

Referring now to both FIG. 1 and FIG. 2 together in further describing various spatial relationship configuration and structurally functional aspects of certain of the glazing frame hardware components of the instant invention embodiment shown as an exemplary vertically disposed double hung sliding window version 12 thereof when configured in the closed single plane closure locking mechanism secured configuration 14 as shown in front elevation in FIG. 1 and in the end elevation thereof in FIG. 2. As will be noted in both FIG. 1 and FIG. 2, but best shown for present purposes in FIG. 2, both the vertically slidable upper 24 and transversely displaceable vertically slidable lower 26 glazing frame sashes respectively are provided with glazing frame hardware components as follows. For purposes of accomplishing the lower glazing frame sash 26 disengagement from a closed single plane closure locking mechanism secured configuration 14 to enable transversely displaceable vertically slidable and removable functions thereof the lower sash vertical frame members 36 of said frame sash 26 are each provided proximate the downward ends thereof respectively with structural inward projecting sash-outward facing horizontally disposed channel members 38 integrally perpendicular thereto each of which channel members 38 slidably engage within the elongated outward facing channel openings 40 thereof a vertically displaceable channel engagement pivot lug 42 retractably extensible vertically by connection within the slide jamb 18 track structure of said portal encasement frame structure 16 to any one of a suitable sash suspension cable assembly means such as those that are well known in the art and not otherwise herein further described wherein the cooperative assembly combination thereof operably functions within the building structure portal encasement frame structure 16 slide jamb 18 track structure to enable, by methods hereinafter to be more fully described during subsequent illustration consideration, parallel transverse displacement of the lower glazing frame sash 26 thereafter for vertically slidable displacement and/or removal thereof. Additionally, in cooperative mechanical function with the channel member 38 and vertically displaceable channel engagement pivot lug 42 assemblies as above-identified, the transversely displaceable vertically slidable and removable lower glazing frame sash 26 has assembled respectively each lower sash vertical frame member 36 at the upward disposed vertical ends thereof a spring-loaded slide jamb track keeper 44 which in turn function respectively to maintain the upper end of the lower glazing frame sash 26 slidably displaced within either of a selected transversely aligned parallel set of vertically disposed slide jamb 18 tracks of said portal encasement frame structure 16, being either the single plane sash alignment slide jamb tracks 46 or the parallel transverse off-set slide jamb tracks 48.

The vertically slidable and removable upper glazing frame sash is likewise provided with certain glazing frame hardware components as follows, whereby single plane vertical displacement within the single plane sash alignment slide jamb tracks 46 and structure inward pivotal tilting thereof from a vertically displaced position within said single plane sash alignment slide jamb tracks 46 and/or removal therefrom are accomplished, the certain additional glazing frame hardward components thereof being in cooperative combination a laterally disposed set of upper glazing frame sash lug engagement pivot blocks 50 each of which blocks respectively is suspended retractably extensive vertically within the laterally spaced single plane sash alignment slide jamb tracks 46 of said portal encasement frame structure 16 by affixment to any one of a suitable sash suspension cable assembly means such as those that are well known in the art and not otherwise herein further described, wherein each of said pivot blocks 50 is provided with a shaped recessed opening adapted to insertably receive and retain therein or rotate and release therefrom a complementary shaped upper sash pivot block lug 52 one each of which is fixedly assembled by suitable means perpendicularly outward projecting proximate the downward ends respectively the upper sash vertical frame members 54 of said upper glazing frame sash 24 and further having assembled respectively each upper sash vertical frame member 54 at the upward disposed vertical ends thereof as previously identified and briefly described a spring-loaded slide jamb track keeper 44 which function respectively to maintain the upper end of the upper glazing frame sash 24 slidably displaced within the vertically disposed laterally spaced single plane sash alignment slide jamb tracks 46.

Additional structural features shown in FIG. 2 include the upper glazing frame sash abutment closure apron 56 which helps, in cooperative combination with the transverse lower glazing frame sash abutment closure apron 32 as was previously identified, to both seal and secure the longitudinally disposed single plane vertically interlocked abuttable head-to-foot contiguously aligned interface junction between the upper 24 and lower 26 glazing frame sashes when disposed in the closed single plane closure locking mechanism secured configuration 14. Also shown in FIG. 2 are various of those screws 58 whereby the portal closure slide jambs 18 are secured to the jamb connecting header 20 and jamb connecting sill 22 and certain of other component parts of the portal encasement frame structure 16.

Also shown in FIG. 2, which comprises both a structural and functional feature of the instant inventive combination with respect to thermal barrier or insulative aspects thereof in substantially eliminating problems as regards conductive and convective thermal differential heat transfer through a portal closure means, likewise to be more fully discussed hereinafter when considering in greater detail the additional thermal barrier structural and functional features of the instant invention, is the transverse portal encasement frame structure thermal barrier connector assembly 60 whereby thermal differential transmittance conductively from building structure interior ambient conditions to exterior ambient conditions through the portal encasement frame structure 16 per se is prevented.

In the foregoing regard, in consideration generally thus far of various glazing frame hardware components of the instant invention exemplary vertically disposed double hung sliding window version 12 embodiment thereof as above-described, it should be specifically pointed out and remembered that the vertically displaceable channel engagement pivot lug 42 elements always slidably operate vertically within the parallel transverse off-set slide jamb tracks 48 of the portal encasement frame structure 16 and the transversely displaceable vertically slidable and removable lower glazing frame sash 26 by means of channel members 38 therewith in combined mechanical cooperation of said pivot lug 42 elements in transverse displacement movement thereby enables transverse offset parallel displaced movement of said lower glazing frame sash 26 from the single plane sash alignment slide jamb track 46 closed single plane closure locking mechanism secured configuration 14 to acccomplishment of various other portal closure sash configurations to now be discussed in combined detailed consideration of FIGS. 3 through 6 inclusive hereinafter with reference as deemed appropriate to certain of the other more detailed illustrations hereof in describing further both structural and functional embodiments and features of the instant invention.

The FIG. 3 illustration of said instant invention exemplary embodiment 12 is a structurally simplified reduced scale sectional elevation view thereof as the same would otherwise appear if seen along the line 3—3 of FIG. 1, which when considered with additional simplified elevation views as in FIGS. 4–6 serve to progressively show for purposes of mechanical operation description the various optional positioning configurations respectively of upper 24 and lower 26 glazing frame sashes in providing thereby ventilation or accomplishing maintenance or repair operations thereon. It should be further noted that additionally shown in the illustrations of instant consideration, to be also hereinafter more fully described, are both the upper glazing frame sash thermal barrier connector assembly 62 and the lower glazing frame sash thermal barrier connector assembly 64 which functions respectively to substantially prevent conductive thermal differential heat transfer through the upper 24 and lower 26 glazing frame sash structures supportably retaining therein respectively sets of transversely spaced and sealed transparent thermal barrier glazing panes 28 that in turn substantially prevent convective thermal differential heat transfer therethrough.

In going from the closed single plane closure locking mechanism secured configuration 14 as shown respectively in FIGS. 1 and 2, to the sash detached closure released configuration 66 as shown in FIG. 3, one first rotates the pivotal lever lock handle 34 counterclockwise ninety-degrees more or less to a vertical position as shown, thereby releasing pivotal lever lock 30 from the closure locking mechanism secured configuration, and thereafter upon compressive finger pressure spring retractive releasing respectively of lower glazing frame sash spring-loaded slide jamb track keepers 44 from retentive engagement with the single plane sash alignment slide jamb tracks 46 followed by an application of hand force pull pressure to the pivotal lever lock handle 34 with a simultaneous directed compound force vector lower sash opening motion as generally indicated by Arrow "a", the lower glazing frame sash 26 is thereupon caused to elevatingly disengage from the closed single plane closure locking mechanism secured configuration 14 arcuately in pivotal transverse displacement with an automatic extensive retentive re-engagement of lower glazing frame sash spring-loaded slide jamb track keepers 44 respectively within the parallel transverse off-set slide jamb tracks 48 and further with channel members 38 respectively in received engagement of vertically displaceable channel engagement pivot lugs 42 as shown. Thus the portal closure sash structure is releasably detached and thereby positioned for disposition through subsequent manipulative operations in accomplishing sash transverse displacement, sash elevation and lowering, pivotal tilting, and/or removal thereof.

Full transverse displacement and parallel disposition elevation of the lower glazing frame sash 26 with respect to the upper glazing frame sash 24 is as shown in FIG. 4 and is accomplished simply by hand application of additional pull and lifting force pressure to the lever lock handle 34 with a continued direction of extensive compound force vector lower sash elevation motion as generally indicated by Arrow "b", thus causing the lower end of said lower glazing frame sash 26 to cammably displace rearward to vertical alignment by arcuate tracking respectively in retained communication of elongated outward facing channel openings 40 of channel members 38 along vertically displaceable channel engagement pivot lugs 42 slidably engaged on laterally spaced disposition within parallel transverse off-set slide jamb tracks 48 of the portal encasement frame structure 16 thereby enabling vertical elevation displacement thereof within slide jamb tracks 48 parallelly in transverse offset relationship with respect to upper glazing frame sash 24, being the transversely displaced parallelly open sash configuration 68.

With the upper 24 and lower 26 glazing frame sashes configured in parallel transverse disposition as shown in FIG. 4, being offset one from the other in separate transverse jamb track sets out of the single phase configuration as earlier shown and described in consideration of FIGS. 1 and 2, one is then able to, among other things in further utilization of the glazing frame hardware component combination capabilities as herein taught, vertically displace the upper and lower sashes independently of the other. As shown in FIG. 5, with respect to the upper glazing frame sash 24 vertical displacement thereof downward is accomplished by simply exerting a downward hand force thereon to thereby cause downward displaced vertical movement thereof within the single plane sash alignment slide jamb tracks 46 to a position such as illustrated. Vertical displaced movement of the lower glazing frame sash 26 within the parallel transverse off-set slide jamb tracks 48 is accomplished by a similar application of hand force either upward or downward. Further shown in FIG. 5, however, is inward tilting disposition of the lower glazing frame sash 26 while being supportably retained at an obtuse angle relative to the portal encasement frame structure 16, which is simply accomplished from the FIG. 4 vertical displacement disposition of said lower glazing frame sash 26 by application of compressive spring deflective finger pressure respectively upon the lower glazing frame sash spring-loaded slide jamb track keepers 44 thereby releasing from retentive engagement with the parallel transverse off-set slide jamb tracks 48 the upper end of said lower glazing frame sash 26 thereby, upon application of a hand pull force to the pivotal lever lock handle 34 as generally indicated by Arrow "c", enables pivotal lower end channel member 38 to vertically displaceable channel engagement pivot lug 42 retained upward end tilting thereof inward of the building structure for purposes such as improved ventilation, cleaning, or repair the same being transversely displaced single sash tilt open configuration 70.

Figures 11, 13, 14, 15, 16:
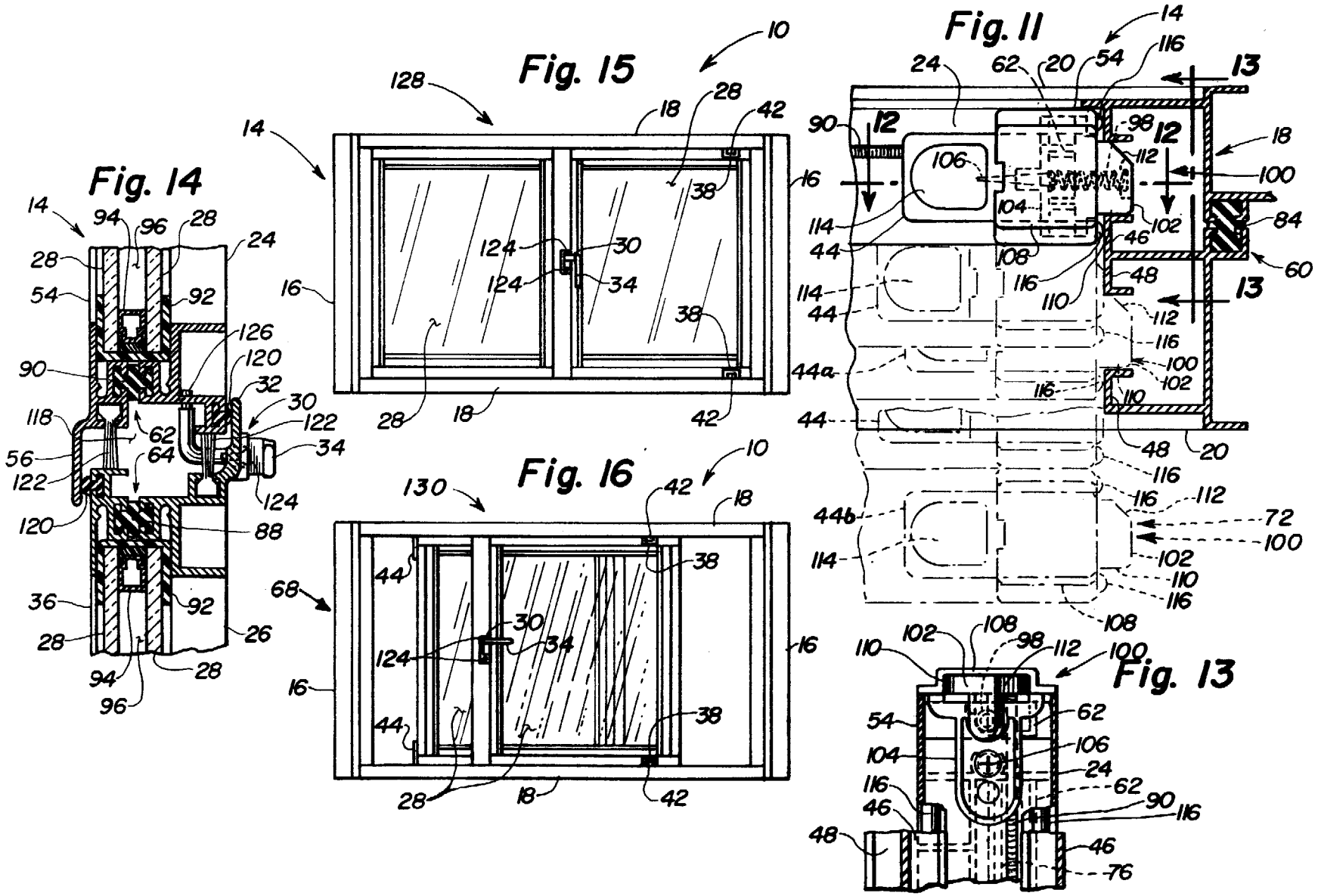
FIG. 11 is an enlarged top plan view of the sash pivot release hardware as seen along the line 11—11 of FIG. 1.
FIG. 13 is an end elevation of the sash pivot release hardware and frame assembly corner connection means as seen along the line 13—13 of FIG. 11.
FIG. 14 is an enlarged end sectional elevation of the closure locking mechanism configured in the closed single plane secured configuration as seen along the line 14—14 of FIG. 1.
FIG. 15 is a front elevation of an exemplary insulated multiple component single plane building structure portal closure embodying the principals of the instant invention, being shown herein as viewed outward looking from the inside of a building structure and for further purposes of illustration and description as a horizontal double hung slide operable window version thereof, wherein the respective glazing frame sashes of said window are positioned in the closed single plane closure locking mechanism secured configuration.
FIG. 16 is a front elevation of an exemplary insulated multiple component single plane building structure portal closure embodying the principals of the instant invention, being also shown herein as viewed outward looking from the inside of a building structure and for further purposes of illustration and description as a horizontal double hung slide operable door version thereof, further illustrating therein the disposition of each panel of said door of said portal closure being slidably displaced horizontally one with respect to the other in an opened closure locking mechanism released configuration.

In FIG. 6 there is illustrated the transversely displaced dual sash tilt and removal configuration 72 of the exemplary vertically disposed double hung sliding window version 12 of the instant invention 10, therein showing inward tilting disposition of both the lower 26 and upper 24 glazing frame sashes and in phantom the removals respectively thereof from the portal encasement frame structure 16. Inward tilting disposition of the upper glazing frame sash 24 while being supportably retained at an obtuse angle relative to the portal encasement frame structure 16, which is likewise for purposes of improved ventilation or accomplishing maintenance operations thereon such as cleaning or repair, is simply accomplished from the vertically downward displacement disposition thereof as shown in FIG. 5 also by application of compressive spring deflective finger pressure respectively upon the upper glazing frame sash spring-loaded slide jamb track keepers 44 thereof thereby releasing initially the same from retentive engagement with the single plane sash alignment slide jamb tracks 46, and thereafter also release from the parallel transverse off-set jamb tracks 48 of the upper end of said upper glazing frame sash 24, and upon application of a hand pull force to the upper glazing frame sash 24 as generally indicated by Arrow "d", thereby effecting transmission of arcuate displacement motion thereof through upper sash pivot block lugs 52 to thereby in turn cause respectively rotation of the upper sash lug engagement pivot blocks 50 whereby tilting of said upper glazing frame sash 24 inward of the building structure with the lower end thereof being supportably retained in pivotal disposition within the upper sash lug engagement pivot blocks 50 slidably engaged in turn on laterally spaced disposition within the single plane sash alignment slide jamb tracks 46 is accomplished. In the foregoing respect, releasable operation of the upper glazing frame sash spring-loaded slide jamb track keepers 44 as above related will be more fully detailed and described upon consideration of the FIG. 11 illustration hereinafter.

Also illustrated in FIG. 6 is the removal respectively of upper 24 and lower 26 glazing frame sashes from supportable retention within the portal encasement frame structure 16 respectively shown by the corresponding phantom views thereof in FIG. 6, both being accomplished generally and simply as follows. Removal of the lower glazing frame sash 26 obtains by liftably disengaging slidably and simultaneously the elongated outward facing channel openings 40 of the channel members 38 from the vertically displaceable channel engagement pivot lugs 42 by upward movement of said frame sash 26, as shown by phantom arrow sets illustrated therewith. Removal of the upper glazing frame sash 24 likewise obtains by upward movement of said frame sash 24, as shown also by phantom arrow sets illustrated therewith, thereby liftably disengaging simultaneously the upper sash pivot block lugs 52 respectively from received communication within the shaped recessed openings of the upper sash lug engagement pivot blocks 50 thereby also accomplishing removal of the upper glazing frame sash 24 from supportable retention within the portal encasement frame structure 16.

An additional mechanical feature of both the vertically displaceable channel engagement pivot lugs 42 and the upper sash lug engagement pivot blocks 50, when respectively disposed in a vertically intermediate sash removal configuration within either the parallel transverse off-set slide jamb tracks 48 or the single plane sash alignment slide jamb tracks 46 as above-described with respect to FIG. 6, is that the same are retained by frictional fit respectively within the slide jamb tracks therefor at the position of sash removal therefrom such that said glazing frame sashes may thereafter be respectively replaced thereto with facilitated ease and convenience.

The insulated multiple component single plane building structure portal closure 10 in the basic and exemplary vertically disposed double hung sliding window version 12 embodiment, or any other modified version embodiments thereof, is preferably constructed from metal, glass, and other natural or synthetic materials, however, any other suitable materials, natural or synthetic, or combinations thereof may be used.

Figures 7, 8, 9, 10, 12:
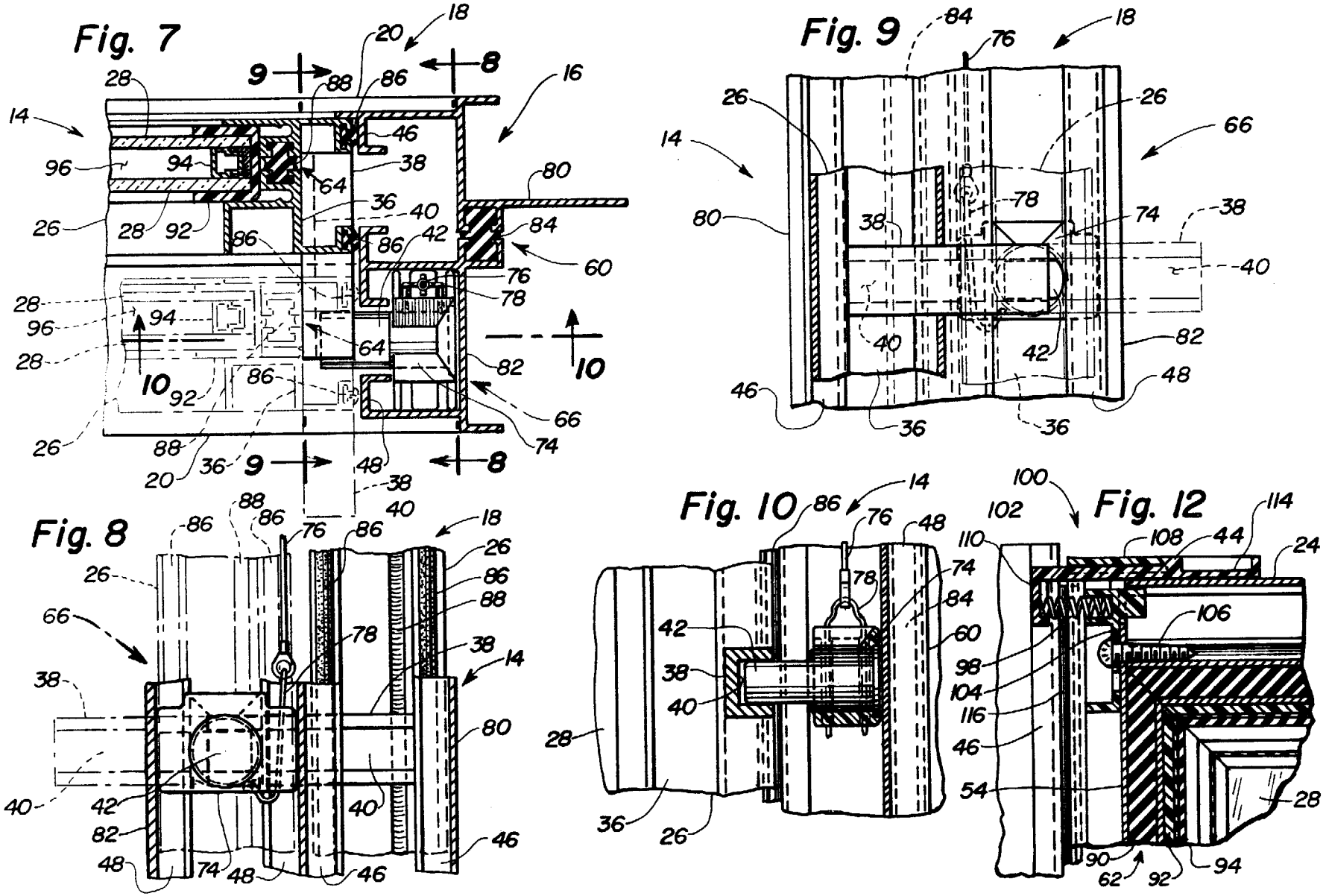
FIG. 7 is an enlarged top plan sectional view of the portal closure lower sash assembly hardware as seen along the line 7—7 of FIG. 1, with the lower sash thereof being shown in phantom in a disposition to be slidably displaceable vertically relative the upper sash of said portal closure.
FIG. 8 is an enlarged side elevation of the portal closure lower sash assembly hardware as seen along the line 8—8 of FIG. 7.
FIG. 9 is an enlarged side elevation of the portal closure lower sash assembly hardware as seen along the line 9—9 of FIG. 7.
FIG. 10 is an enlarged end elevation of the portal closure lower sash assembly hardware as seen along the line 10—10 of FIG. 7.
FIG. 12 is a side sectional elevation of the sash pivot release hardware as seen along the line 12—12 of FIG. 11, illustrating therein also the corner connection means for the frame assembly of said portal closure.

In FIG. 7 attention is directed to structural and functional detail of the lower glazing frame sash 26 in terms both of operational displacement for opening thereof as well as the thermal barrier characteristics thereof. Considering first the operational aspects, wherein it will be seen in the first instance in phantom illustration thereof transverse parallel displacement of said lower glazing frame sash 26 by means of receivably rearward guided cammable communication movement of channel member 38 elongated outward facing channel opening 40 upon vertically displaceable channel engagement pivot lug 42 in accomplishing as previously discussed in consideration of FIG. 3 the sash detached closure released configuration 66 from the closed single plane closure locking mechanism secured configuration 14 as previously discussed during combined consideration of FIGS. 1 and 2. Additional glazing frame hardware component detail illustrated in FIG. 7 is that of the vertically displaceable channel engagement pivot lug slide block 74 within which said lug 42 is pivotally retained axially therewith and is in turn friction-fit to be, however, slidably displaceable within said parallel transverse off-set slide jamb tracks 48 in retractible extensive suspension vertically by affixment to sash suspension cable 76 connected by means of bail 78 to said pivot lug slide block 74.

Considering second thermal barrier aspects of the detail shown in FIG. 7, wherein will more particularly be seen the transverse portal encasement frame structure thermal barrier connector assembly 60 whereby the exterior portal closure slide jamb side 80 of the portal closure slide jambs 18 is joined to the interior portal closure slide jamb side 82 thereof by means of thermally nonconductive slide jamb connecting member 84 communicating therebetween, whereby thermal differential building structure interior-to-exterior heat transfer losses as a result of conduction transversely through the portal encasement frame structure 16 is substantially eliminated. Cooperatively, in combined conductive thermal barrier structure with the foregoing transverse portal encasement frame structure thermal barrier connector assembly 60 and the thermally non-conductive slide jamb connecting member 84 thereof, however, are also in the case of instant consideration the transversely spaced lower glazing frame sash-to-slide jamb thermally non-conductive resilient contact seals 86 which serve to substantially eliminate thermal differential building structure interior-to-exterior heat transfer losses as a result of either lateral or transverse direction conductance between the portal encasement frame structure 16 and the portal closure slide jambs 18, and further in dual cooperative lateral and transverse thermal conductance barrier structure therewith is the thermally non-conductive lower glazing frame sash transverse connecting member 88 of the lower glazing frame sash thermal barrier connector assembly 64 whereby the exterior side of the lower glazing frame sash is joined to the interior side transverse thereof by means of said thermally non-conductive sash transverse connecting member 88 such that there is substantially no thermal differential interior-to-exterior conductance leak compromise of the transversely spaced and sealed transparent thermal barrier glazing panes 28 supported thereby which in turn serve to substantially block totally both conductive and convective thermal differential heat transfer losses through the building structure portal closure 10 hereof and the exemplary embodiment 12 thereof.

In the foregoing regard it should be noted that as to both the thermally non-conductive slide jamb connecting member 84 and thermally non-conductive lower glazing frame sash transverse connecting member 88, and the yet to be discussed thermally non-conductive upper glazing frame sash transverse connecting member 90 of the upper glazing frame sash thermal barrier connector assembly 62, all respectively communicate peripherally intermediate the transverse structural interior-to-exterior sides joined thereby in order to provide respectively a total transverse thermal differential conductance barrier of material physically and conductively dissimilar to that of which is connected.

Further shown in FIG. 7 are transverse assembly details of the transversely spaced and sealed transparent thermal barrier glazing panes 28, being principally the compressive sealed fitting and retention thereof by means of a pliable non-conducting receiving gasket 92 set within the frame structure of said lower sash 26 as shown to hold in spaced parallel transverse disposition said glazing panes 28 one from the other by means of a non-conductive spacing strip 94 frictionally inserted therebetween to thus provide a substantially non-convective thermal differential dead air space 96 also therebetween whereby a combined fully non-conductive and non-convective insulation barrier between the interior ambient and exterior ambient atmospheres and respective thermal differentials thereof either side of said portal closure 10 is obtained.

The views shown in FIGS. 8, 9, and 10 are primarily of the cooperative mechanical configurations and function accomplished with the channel member 38 and vertically displaceable channel engagement pivot lug 42 assemblies as seen along section lines of FIG. 7 respectively corresponding thereto with the same disposed in both the transversely displaceable vertically slidable and removable lower glazing frame sash 26 closed single plane closure locking mechanism secured configuration 14 and the sash detached closure released configuration 66, wherein also are shown additional assembly details of the sash suspension cable 76 and bail 78 affixment thereof to the vertically displaceable channel engagement pivot lug slide block 74 in axial receipt pivotal support of said vertically displaceable channel engagement pivot lug 42 and friction-fit slidable communication with parallel transverse off-set slide jamb track 48, as well as the combined portal encasement frame structure transverse thermal differential non-conductive and non-convective barrier means provided by the insulated multiple component single plane building structure portal closure 10 of instant teaching.

The fragmentary enlarged top plan multiple sequential view shown in FIG. 11 illustrates various dispositions of upper glazing frame sash 24 in being manually articulated upon compressive release of the spring-loaded slide jamb track keeper 44 from the closed single plane closure locking mechanism secured configuration 14 as seen generally along the line 11—11 of FIG. 1 through the transversely displaced dual sash tilt and removal configuration 72 as previously discussed in consideration of FIG. 6 hereof, as well as also illustrating additional structural and operational detail of said spring-loaded slide jamb track keeper 44. It will be noted, as seen in top plan view in FIG. 11, but better shown in the FIG. 12 side sectional elevation thereof, said spring-loaded slide jamb track keeper 44 is provided with a keeper extensive compression spring 98 which operates to maintain the keeper 44 in a normally extended slide jamb engaging configuration 100 wherein the jamb engagement keeper shoulder 102 thereof extendibly, under pressure of said spring 98, is caused to engage that slide jamb track aligned proximately lateral thereto as shown and in so doing detachably fixes from pivotal movement in a vertical plane that particular glazing frame sash to which said keeper 44 is affixed, in the case of instant consideration being the upper glazing frame sash 24 in the single plane sash alignment slide jamb track(s) 46, wherein it is to be understood that a glazing frame sash so disposed is retained within a spaced set of laterally aligned slide jamb tracks by a set of keepers 44 affixed respectively at the upper ends of such sash vertical frame members 54 or 36 as previously described, but for purposes of instant discussion only one keeper 44 of such a set is considered since the operation respectively thereof is identical.

It will be further observed on continued inspection of FIG. 11, as also shown in FIG. 12, and the end elevation thereof seen in FIG. 13 as taken along the line 13—13 of FIG. 11, said spring-loaded slide jamb track keeper 44 is provided with a depending mounting bracket structure 104 integral thereto the same being adapted to insertably receive therethrough bracket connecting screw 106 for connectable communication thereof with the upper glazing frame sash 24 structure as respectively illustrated in aforesaid Figures. The keeper 44 per se is slidably inserted within and retained by the keeper housing 108 and provided at the jamb engagement keeper shoulder 102 end transversely rearward thereof with a jamb stop engagement surface 110 and on the transversely opposite forward side thereof with a latch retract cam surface 112 whereby pivotal closure of a sash from a tilt disposed configuration or forward transverse parallel displacement thereof from the parallel transverse offset slide jamb tracks 48 to the single plane sash alignment slide jamb tracks 46 is greatly facilitated. At the keeper 44 end longitudinally opposite the jamb engagement keeper shoulder 102 end thereof the same is provided with a detented finger catch 114 whereby manual engagement and retraction thereof as necessary is likewise facilitated. Also provided with the upper glazing frame sash 24 as best shown in FIGS. 11 through 13 series are the transversely spaced upper glazing frame sash-to-slide jamb thermally non-conductive resilient contact seals 116 being structurally and functionally similar in upper glazing frame sash 24 thermal differential conductive barrier application and purpose to those resilient contact seals 86 previously described herein as to the application and purpose thereof with respect to the lower glazing frame sash 26.

The last consideration with regard to FIG. 11, and to that extent as applicable the FIGS. 12 and 13 sectional derivative views obtaining therefrom, are the respective spring-loaded slide jamb track keeper **44*a* and 44*b* positions as illustrated in phantom in FIG. 11, wherein said keeper 44*a* position is that of pivotally transverse displaceable engagement of the upper glazing frame sash 24 with the parallel transverse offset slide jamb tracks 48 during manually articulated pivotal transition thereof to or from the transversely displaced dual sash tilt and removal configuraion 72 a shown by said keeper 44*b* position, which is the same also for any other spring-loaded slide jamb track keeper 44 in functionally operational opening and/or closing use thereof whether assembled to a vertically displaceable upper 24 or lower 26** glazing frame sash, or for that matter to a horizontally operable glazing frame portal closure sash or panel for use in either a window or door application.

In FIG. 14 greater co-active structural communication detail of the upper 24 and lower 26 glazing frame sash disposed in the closed single plane closure locking mechanism secured configuration 14 is shown as the same would appear in enlarged end sectional elevation when viewed along the line 14—14 of FIG. 1 illustrating therein more clearly both the improved physical security features and the thermal differential conductive and convective barrier structure thereof. With respect to physical security aspects it will be noted that respectively the lower glazing frame sash abutment closure apron 32 and upper glazing frame sash abutment closure apron 56 respectively provide transversely spaced sash-integral barrier surfaces laterally side-to-side of the abutting juncture of said sashes 24 and 26 within the portal encasement frame structure portal closure slide jambs when disposed as shown in the closed single plane closure locking mechanism secured configuration 14, whereupon, physically, said aprons 32 and 56 thereby serve in blocking access to the closure secured dead air juncture space 118 vertically intermediate said sashes 24 and 26 thereby also substantially preventing insertion of a pry tool or the like therebetween for purposes of compromising the secured portal closure configuration 14 for purposes of gaining surreptitious forced entry to the building structure. With regard to the thermal differential conductive and convective barrier structure it will be seen there is substantially no thermal differential convective communication either vertically or transversely of said upper 24 or lower 26 glazing frame sashes due to the sealed interposition therebetween of said closure secured dead air juncture space 118. Conductive thermal differential communication vertically between said sashes 24 and 26 is substantially prevented also by means of transversely spaced laterally extending thermally non-conductive resilient contact apron seals 120 which further function, in combination with dead air juncture space interior thermally non-conductive laterally extending dampening brushes 122, to substantially prevent transverse conductive thermal differential communication between said sashes 24 and 26.

Additionally shown in FIG. 14 is further assembly detail of the pivotal lever lock 30 wherein the same is secured to the building structure interior lower glazing frame sash abutment closure apron 32 by means of lever lock securement screws 124 and the latching pawl 126 of said pivotal lever lock 30 is shown in the locking mechanism secured configuration 14 disposition. It is to be noted that the pivotal lever lock 30 assembly as instantly considered is identical structurally and operationally whether in use for either vertically or horizontally operable embodiment versions of the insulated multiple component single plane building structure portal closure 10 invention hereof.

All foregoing descriptions have dealt with explaining the instant invention 10 exemplary vertically disposed double hung sliding window version 12 embodiment thereof. As has been previously stated, however, the structures and functions obtained by said instant invention 10 in the exemplary vertically operable embodiment 12 thereof are equally adaptable and applicable to an exemplary horizontally disposed double hung sliding window version 128 or door version 130, which in either such horizontal application embodiment of said invention 10 are shown in FIGS. 15 and 16 being respectively the closed single plane closure locking mechanism secured configuration 14 and transversely displaced parallelly open sash and/or panel configuration 68 thereof. Since all insulating functional, and operational hardware structural, features of the horizontal embodiment(s) 128 even though spatially repositioned therein, and the sequential opening and closing and/or tilting disposition and removal of the transparent thermal barrier glazing panes or panels 28 thereof, are identical to all of the same heretofor related in detail for the vertical embodiment 12 of said invention 10, it is to be understood the same applies to the horizontal embodiments 128 and 130 hereof coequally that is, the cooperative mechanical functions of the channel members 38 and channel engagement pivot lug 42 assemblies, and the spring-loaded slide jamb track keepers 44 in accomplishing articulated disposition of the panes or panels 28 are mechanically operable as heretofore described.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

I claim:

1. An insulated multiple component single plane building structure portal closure having a thermal differential building structure interior-to-exterior transversely intermediate conductive and convective barrier structure with a plurality of glazing frames therein provided respectively with a glazing frame hardware assembly each therefor to mechanically enable a manually articulated transverse off-set parallel displacement of one of a glazing frame thereof of said plurality of glazing frames from a closed single plane closure secured disposition within said plurality of glazing frames thereof in turn within a portal encasement frame structure of said portal closure to a respectively parallelly planar slidably open displacement disposition in addition to all of said glazing frames thereof being pivotally tiltable and removable from said portal encasement frame structure, said insulated multiple component single plane building structure portal closure comprising in combination:

a. a transversely parallel set of laterally spaced glazing frame slide jambs integral to said portal encasement frame structure and slide jambs being structurally interconnected one to the other transversely building structure interior-to-exterior intermediate thereof by a thermally non-conductive connecting member and adapted respectively by means of said glazing frame hardware assembly to articularly receive therein said plurality of glazing frames;

b. a longitudinally spaced set of jamb connecting members joining said transversely parallel set of laterally spaced glazing frame slide jambs at the respective longitudinal ends thereof apart laterally equidistant said jamb connecting members in turn respectively structurally embodying transversely building structure interior-to-exterior intermediate thereof another of said thermally non-conductive connecting member;

c. a lower glazing frame sash assembly provided with a lower glazing frame hardware assembly comprised in combination of a laterally spaced set of elongated channel member components integral to said lower glazing frame sash respectively disposed the lower proximity outwardly either lateral vertical side thereof and projecting building structure interior therefrom to respectively receivably engage cooperatively within a channel opening thereof a slide jamb engaged vertically displaceable channel engagement pivot lug such that said lower glazing frame hardware assembly cooperatively enables transversely displaceable movement parallelly of said lower glazing frame sash from a building structure exterior slide jamb of said portal encasement frame structure to a building structure interior slide jamb thereof;

d. a pivotal lever lock assembled to a laterally disposed apron member of said lower glazing frame sash and adapted by means thereof to lockably secure said lower glazing frame sash to another of said plurality of said glazing frames disposed contiguously next vertically upward thereof when articularly configured in said closed single plane closure secured disposition wherein all of said plurality of said glazing frames are longitudinally disposed within said portal encasement frame structure respectively in an interlocked abuttable head-to-foot contiguously aligned interface junction therebetween; and e. a closure secured dead air juncture space sealably enclosed the periphery thereabout with an alternating plurality of thermally insulative gasket strips spatially disposed in interposed communication vertically intermediate between said lower glazing frame sash and said another of said plurality of said glazing frames contiguously next vertically upward thereof to thereby substantially prevent thermal differential energy transfer therebetween when the same are configured in the closed single plane closure secured disposition.

2. An insulated multiple component single plane building structure portal closure according to claim 1 in which the physical configuration thereof embodies a double hung vertically slidable sash structure comprising a lower glazing frame sash assembly and an upper glazing frame sash assembly.

3. An insulated multiple component single plane building structure portal closure according to claim 2 wherein the double hung vertically slidable sash structure thereof is a window.

4. An insulated multiple component single plane building structure portal closure according to claim 2 in which said upper glazing frame sash assembly is provided with an upper glazing frame hardware assembly.

5. An insulated multiple component single plane building structure portal closure according to claim 4 in which said upper glazing frame hardware assembly is comprised in combination of a laterally spaced set of pivot block lugs affixed to said upper glazing frame sash respectively disposed the lower proximity outwardly either lateral vertical side thereof and adapted respectively to be receivably engaged cooperatively within a slotted opening of a lug engagement pivot block each of which is in turn engaged vertically displaceable laterally of said portal encasement frame structure within said building structure exterior slide jambs thereof.

6. An insulated multiple component single plane building structure portal closure according to claim 5 wherein said upper glazing frame sash is further provided with a laterally spaced set of spring-loaded slide jamb track keepers affixed either upward side thereof whereby said upper glazing frame sash upward end is releasably retained for vertically slidable displacement of said upper glazing frame sash within the building structure exterior slide jamb or retractable releasing of the upper end thereof therefrom for building structure interior pivotal tilting in mechanical cooperation with said upper glazing frame hardware assembly whereupon liftable removal of said upper glazing frame sash therefrom is thereupon enabled.

7. An insulated multiple component single plane building structure portal closure according to claim 1 wherein said slide jamb engaged vertically displaceable channel engagement pivot lugs are laterally engaged respectively within the building structure interior slide jambs thereof.

8. An insulated multiple component single plane building structure portal closure according to claim 1 wherein said lower glazing frame sash is further provided with a laterally spaced set of spring-loaded slide jamb track keepers affixed either upward side thereof whereby said lower glazing frame sash upward end is releasably retained for vertically slidable displacement of said lower glazing frame sash within the building structure interior slide jamb for retractable releasing of the upper end thereof therefrom for building structure interior pivotal tilting in mechanical cooperation with said lower glazing frame hardware assembly whereupon liftable removal of said lower glazing frame sash therefrom is thereupon enabled.

9. An insulated multiple component single plane building structure portal closure according to claim 1 in which said lower glazing frame sash assembly is structurally comprised of a transversely spaced set of lower sash glazing panes sealably supported within a lower sash frame structure circumferential of said lower sash glazing panes and joined transversely intermediate thereof circumferentially thereabout between said transversely spaced set of lower sash glazing panes by a lower glazing frame thermally non-conductive connecting member.

10. An insulated multiple component single plane building structure portal closure according to claim 1 in which said upper glazing frame sash assembly is structurally comprised of a transversely spaced set of upper sash glazing panes sealably supported within an upper sash frame structure circumferential of said upper sash glazing panes and joined transversely intermediate thereof circumferentially thereabout between said transversely spaced set of upper sash glazing panes by an upper glazing frame thermally non-conductive connecting member.

11. An insulated multiple component single plane building structure portal closure according to claim 1 in which the physical configuration thereof embodies a double hung horizontally slidable sash structure comprising a window wherein the glazing frame hardware assembly components thereof are disposed upon one of an end glazing frame sash respectively the lateral end proximity thereof outwardly either vertical side thereof.

12. An insulated multiple component single plane building structure portal closure according to claim 1 in which the physical configuration thereof embodies a double hung horizontally slidable panel structure comprising a door wherein the glazing frame hardware assembly components thereof are disposed upon one of an end glazing frame panel respectively the lateral end proximity thereof outwardly either vertical side thereof.

*13. A building portal closure comprising, in combination,*

*an encasement frame defining a generally rectangular opening, said encasement frame including a pair of spaced parallel glazing frame slide members defining two opposed sides of the encasement frame, said slide members having a pair of parallel channels in their opposed inwardly directed surfaces cooperating to define inner and outer glazing frame support tracks extending substantially the full length of said slide members,*

*a plurality of rectangular glazing frames supported in said encasement frame for sliding movement along said tracks in said slide members, said plurality of glazing frames being adapted to be supported in edge-to-edge coplanar relation in a first plane by one of said support tracks,*

*guide block means slidably mounted in each elongated channel of the other of said support tracks for movement along said slide members,*

*a sash support pin carried by each said guide block means for movement therewith with each said sash support pin projecting from its associated elongated channel into said generally rectangular opening,*

*a pair of elongated channel members having one end portion rigidly mounted one on each of two opposed side edges of one of said rectangular glazing frames, said elongated channel members being located equally distant from corresponding end of the associated side edge of said glazing frame, and extending one adjacent each slide member in a direction transverse to said channels therein,*

*said elongated channel members each defining a guide channel slidably receiving one of said sash support pins whereby said one glazing frame and said support pins are constrained to move together along said slide members,*

*said one glazing frame being manually movable between said first plane and a second parallel plane by sliding said guide channels over said pins and being movable along said slide members with said pins when in said second plane, and*

*manually operable lock means for releasably retaining said plurality of glazing frames in said coplanar relationship.*

*14. The portal closure defined in claim 13 wherein said glazing frame slide members are horizontally extending members comprising a sill and a header, and wherein said plurality of glazing frames are supported for horizontal sliding movement along said inner and outer tracks.*

*15. The portal closure defined in claim 13 wherein said glazing frame slide members are vertical jambs of a window, and wherein said glazing frames comprise a lower and at least one upper glazing frame supported for vertical sliding movement along said inner and outer tracks.*

*16. The portal closure defined in claim 15 wherein said vertical jambs each comprise inner and outer elongated jamb members connected to one another along their length by a thermally nonconducting joining member, and wherein each said elongated jamb member has an inwardly directed surface having one of said channels formed therein.*

*17. The portal closure defined in claim 15 wherein said plurality of glazing frames are adapted to be supported in edge-to-edge coplanar relation by said outer track, and wherein said lower glazing frame is movable between said outer and inner tracks and is vertically movable along said inner track, said at least one upper glazing frame being vertically movable along said outer track when said lower glazing frame is moved to said inner track.*

*18. The portal closure defined in claim 17 further comprising means supporting said glazing frames for manually articulated pivotal movement about horizontal axes and for removal from said encasement frame when pivotted from the vertical.*

* * * * *